United States Patent [19]

Hayes

[11] Patent Number: 5,272,647
[45] Date of Patent: Dec. 21, 1993

[54] VALVE DIAGNOSTIC APPARATUS AND METHOD

[75] Inventor: John Hayes, Port Clinton, Ohio

[73] Assignee: Combustion Engineering, Inc., Windsor, Conn.

[21] Appl. No.: 647,737

[22] Filed: Jan. 30, 1991

[51] Int. Cl.$^5$ .............................................. G06F 15/20
[52] U.S. Cl. ............................... 364/551.01; 364/552; 73/168
[58] Field of Search .................... 364/551.01, 552, 558; 73/168, 862.32; 137/487.5

[56] References Cited

U.S. PATENT DOCUMENTS

| | | | |
|---|---|---|---|
| 4,570,903 | 2/1986 | Crass | 251/129.12 |
| 4,976,144 | 12/1990 | Fitzgerald | 73/168 |
| 5,109,692 | 5/1992 | Fitzgerald | 73/168 |

OTHER PUBLICATIONS

"Presentation to NOMIS Conference on Air Operated Valve Program and Diagnostic Testing"-Paper by John H. Hayes, Toledo Edison, Jul. 17, 1989.

*Primary Examiner*—Jack B. Harvey
*Assistant Examiner*—Ellis B. Ramirez
*Attorney, Agent, or Firm*—L. James Ristas; John H. Mulholland

[57] ABSTRACT

A valve test unit (100) for attachment to a value (12) having a fluidly operated stem actuator (20a) responsive to a positioner device (24a). The unit includes a first input port (102) connectable to a source (104) of fluid pressure, a second input port (106) connectable to a source (108) of electrical power, a first output port (110) fluidly connected to the first input port, for delivering a controlled fluid pressure from the unit, and a second output port (114) electrically connected to the second input port, for delivering a controlled electrical signal from the unit. Test programs (118) are provided for converting fluid pressure, at the first input port, into a controlled, time dependent fluid pressure at the first output port and converting electrical power at the second input port into a controlled, time dependent electrical signal at the second output port. The test unit thus has the capability to control a valve electrically, with either a program voltage or current versus time, or to drive the valve by fluid pressure, e.g., pneumatically. The desired driving function is programmed into the computer associated with the base unit. In effect, the test unit functions on a temporary basis, as a valve positioner for test purposes.

16 Claims, 2 Drawing Sheets

VALVE DIAGNOSTIC APPARATUS AND METHOD

BACKGROUND OF THE INVENTION

The present invention relates to valve diagnostics, and more particularly, to the diagnosis of valves that are installed in process plant flow lines.

Many types of solenoid and control valves are typically present in process plants dedicated, for example, to producing electrical power, refining materials, or producing food. In many such plants, reliable valve operation not only affects the efficiency of the process or the quality of the product, but may also have severe safety consequences. Safety considerations are particularly relevant in nuclear power plants.

Accordingly, it is desirable that some indicator of reliability be obtainable from measurable characteristics of the valve while installed in the flow line, i.e., without removing, disassembling, inspecting, reassembling, and reinstalling the valve. In this context, reliability refers not only to the availability of the valve to operate when actuated, but also the effectiveness of the operation, i.e., stroking from a fully open to a fully closed position when energized within specified limits.

A known approach to such diagnostics includes energizing the valve while obtaining accurate measurements of, for example, stem thrust or displacement. By analyzing the relationship of stem thrust, movement, or similar dependent variable, to the independent energizing variable, such as electric current, hydraulic pressure, or pneumatic pressure in the actuator, certain valve behaviors indicative of reliability can be inferred. Conventionally, such diagnostic techniques rely on actuation of the valve by the positioner and energy source that are associated with the valve during normal operation. Particularly for valves that are fluidly operated, the behavior of the independent variable, e.g., actuator fluid pressure, cannot always be selected or implemented in a way that would best reveal desired information concerning the dependent variable, e.g., stem thrust, position, or displacement.

SUMMARY OF THE INVENTION

It is, accordingly, an object of the present invention to provide a system and method for testing a valve in a process plant flow line, whereby the valve actuator can be controlled during the test, independently of the controller that is normally associated with the valve positioner.

It is a more particular object to provide a portable data acquisition unit for attachment to a valve having a fluidly operated stem actuator responsive to a positioner device, whereby a control signal from the test unit replaces or overrides the control signal normally associated with the positioner.

A valve test unit in accordance with the invention, includes a first input port connectable to a source of fluid pressure, and a second input port connectable to a source of electrical power. The unit has a first output port fluidly connected to the first input port, for delivering a controlled fluid pressure from the unit to the valve actuator. A second output port is electrically connected to the second input port, for delivering a controlled electrical signal from the unit to the valve positioner. The unit includes a test program and associated hardware for transforming the source pressure at the first input port into a controlled, time dependent fluid pressure at the first output port, and transforming the electrical power source at the second input port into a controlled, time dependent electrical signal at the second output port.

In accordance with the inventive method, the test unit is positioned in the vicinity of the valve, and one or both of the first and second output ports is connected to the valve actuator and valve positioner, respectively. If program control of the actuator pressure is desired while bypassing the positioner, the first output port is connected to the actuator, and the fluid pressure in the actuator is controlled in accordance with the time dependence specified by the first program. Alternatively, the second output port is connected to the normal valve positioner, and the second program is selected to specify a predetermined, time-dependent electrical signal as an input to the positioner, which in turn delivers a time-dependent fluid pressure to the valve actuator.

A significant advantage of the present invention is that a portable testing unit can selectively energize the actuator directly with a program-controlled, time-dependent fluid pressure delivered directly from the unit to the actuator, thereby bypassing the normal controller and positioner. Another time-dependent actuation can be achieved by substituting an electrical control signal from the second output port of the unit, for the control signal from the normal valve controller, whereby the normal positioner is controlled from the test unit. Either of these test arrangements can be useful for obtaining significant behavioral characteristics of the valve. If both testing arrangements are utilized for a given valve, differences in valve behavior resulting from programmed control intended to produce identical actuator energizing, can reveal potential problems in the positioner, the pressure and electrical sources for the positioner, or in equipment associated with the controller, upstream of the positioner.

Preferably, the test unit also serves as a device for making and/or recording measurements uniquely associated with the valve test. These include stem thrust or displacement, actuator pressure, and other electrical and pressure signals which may be necessary or desirable for a thorough diagnostic analysis of the valve or valve system.

The test unit in accordance with the invention, thus has the capability to control a valve electrically, with either a program voltage or current versus time, or to drive the valve by fluid pressure, e.g., pneumatically. The desired driving function is programmed into the computer associated with the base unit. In effect, the test unit functions on a temporary basis, as a valve positioner for test purposes. Preferably, the test unit is also adapted to receive and store pneumatic and electrical measurement data.

With an auxiliary unit preferably used in conjunction with the inventive test unit summarized above, a relatively large number of electrical signals (current or voltage) in a pneumatic or hydraulic control loop of the valve, can be monitored. This includes but is not limited to signals associated with E/P or I/P positioners, solenoids, limit switches, position indicators and controllers. Additionally, the user may temporarily install and monitor a variety of instruments to assist in monitoring valve performance. These include strain gauges, load cells, accelerometers, and thermocouples. Although the base test unit preferably includes a sufficient number of electrical input ports and appropriate recording channels to permit the user to obtain significantly more data than had previously been acquired for valve diagnosis in the field, this capability is augmented by the auxiliary unit, which has the capability to monitor additional pneumatic and hydraulic pressures remote from the base unit. The auxiliary unit includes several pressure transducers which tie into the base unit. By using one or more auxiliary units, multiple pressure signals (pneumatic or hydraulic) can be monitored from, and recorded in, the base unit. This allows the user to monitor up to, for example, twelve pressure channels for one valve, or to simultaneous monitor fewer pressure channels but from more than one valve. The auxiliary unit can be tied in closer to the pressure source to reduce pressure lag, relative to a direct connection to the base unit. The auxiliary unit also allows for conversion of current signals into voltage signals for delivery to voltage sensitive ports in the base unit.

BRIEF DESCRIPTION OF THE DRAWINGS

These and other objects and advantages of the invention will be described below in the context of the preferred embodiment, with reference to the accompanying drawings, in which.

DESCRIPTION OF THE PREFERRED EMBODIMENT

Figure 1:
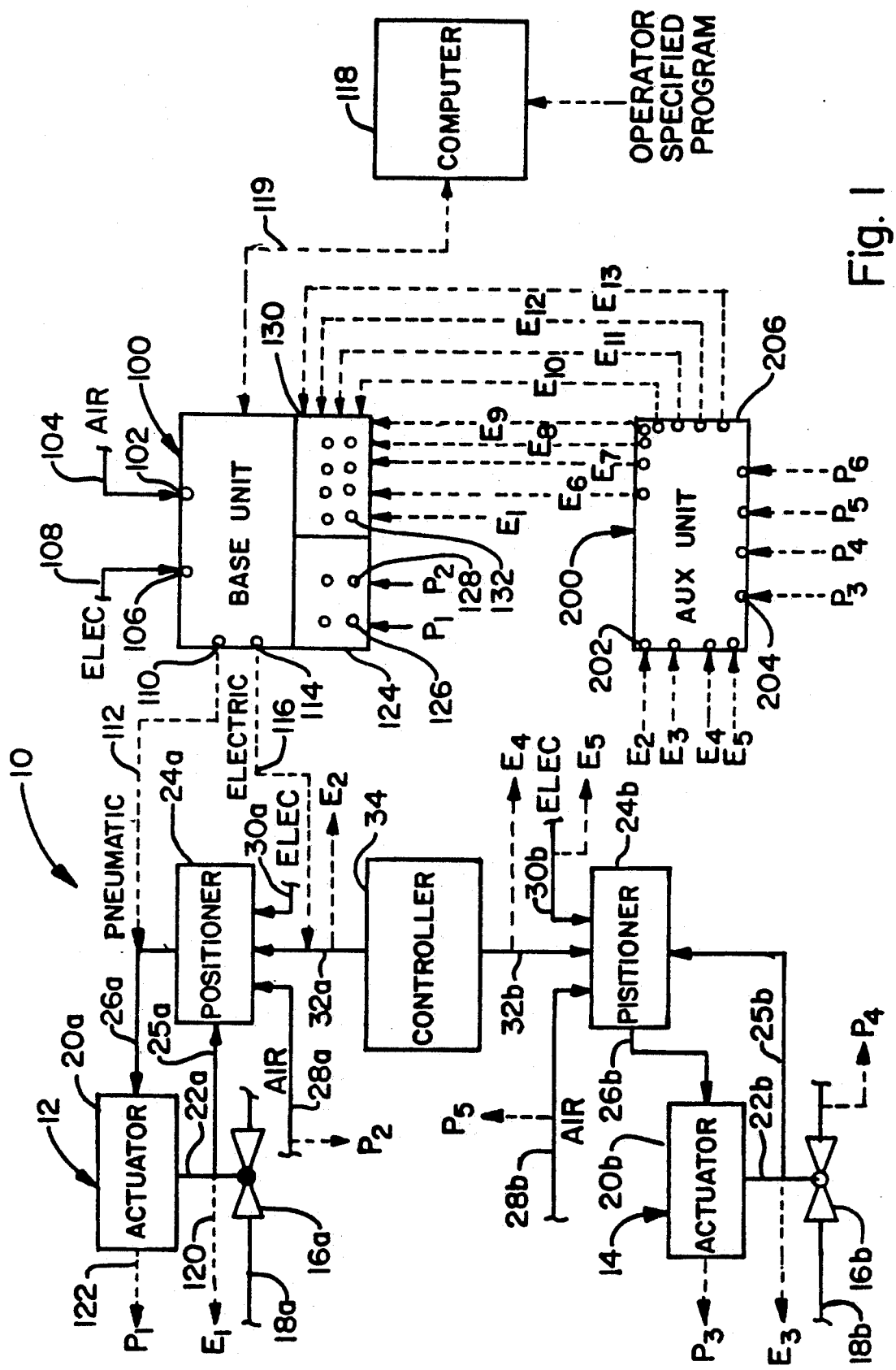
FIG. 1 is a schematic of the test unit of the invention, installed at a valve as part of a more comprehensive valve diagnostic system.

FIG. 1 is a schematic representation of the invention installed at part of a system 10 for acquiring data from valves 12,14. For convenience, structures found on both valves have been given the same numeric identifier, except that those associated with valve 12 will have the suffix "a" and those associated with valve 14, "b". When similar structures on both valves are referenced, the suffix will not be used. These valves may be of substantially any type, and in any event would include a valve body 16a,16b which has a flow bore (not shown) in fluid communication with the respective process flow line 18. It will be understood that each valve has means within the body for sealing the flow bore against flow. A stem, shaft, or similar transmission element 22 (hereinafter generally referred to as "stem") is moved by the valve actuator 20, whereby the stem 22 positions the sealing member within the valve body between open and closed flow conditions.

The present invention is primarily concerned with fluidly operated valves, whereby the actuator is energized by pneumatic or hydraulic pressure. Typically, each valve includes an associated positioner 24 which has an output line 26 through which fluid pressure is delivered at a controlled rate to the respective actuator 20. The positioner inputs would, in the case of a pneumatic valve, include a source of compressed air 28, and a source of electric power 30. Both the initiation, and time dependency of the pressure supplied by the positioner 24 to the actuator 20, is specified by a valve controller 34 via an electrical line 32. The controller is typically remote from the positioner 24, e.g., the controller 34 is in the plant central control room, whereas the positioner 24 is on or at the valve. Typically, for control valves, the positioner 24 receives as an input, a signal from line 25, commensurate with the position of the stem 22. The position data from input 25 are compared with the demand or desired position from signal 32, according to conventional logic within positioner 24, whereby the appropriate pressure is delivered to actuator on line 26.

In accordance with the present invention, a diagnostic or test base unit 100 is connectable to at least one valve 12, for superseding or overriding the controller 34 and/or positioner 24, whereby the valve can be actuated according to a predetermined, time-dependent program.

In the most straightforward apparatus embodiment of the invention, the base unit 100 has a first input port 102 connectable to a source 104 of fluid pressure, e.g., compressed air. This source may either be transported to the vicinity of the valve along with the base unit 100, or, in a more typical situation, source line 104 is connected to air pressure lines that are available throughout the process plant. Similarly, a second input port 106 is connectable to a source of electrical power 108, such as an electrical outlet in the plant.

The base unit 100 has a first output port 110 that is fluidly connected within the unit to port 102, for delivering a controlled fluid pressure from the unit along line 112. Line 112 is selectively connectable to line 26, i.e., directly to actuator 20, downstream of positioner 24a. A second output port 114 is electrically connected within the base unit to the second input port 106, for delivering a controlled electrical signal from the unit on electric line 116. The control signal on line 116 emulates the control signal normally provided by controller 34 along line 32a. When line 116 is input to positioner 24a, via line 32a or otherwise, the valve 12 can be controlled through its positioner 24a, independently of the controller 34.

It should be appreciated that it is well within the skill of the ordinary practitioner in this field to transform a supply of compressed air at a given pressure in line 104, into a time-dependent pressure variation in line 112, and, similarly, to transform a source of electrical power at 110 volts A.C., into a time-dependent D.C. voltage signal along line 116. Thus, the unit 100 includes test program means for converting the fluid pressure at the first input port 102 into a controlled, time-dependent fluid pressure at the first output port 110, and for converting electrical power at the second input port 106 into a controlled, time-dependent electrical signal at the second output port 114.

In the broadest aspect of the invention, the test program means can include conventional transformer hardware with dials or the like, whereby the operator can vary the outputs at ports 110,114 manually. In a more desirable implementation, particular, predetermined, time-dependent output pressures and voltages at ports 110,114 are specified by several different converter or transformer paths within the unit, with switches whereby the operator can select one of the plurality of "hard wired" pressure and electrical test programs. In the preferred embodiment, a computer 118, which may be integral with or separate from the base unit 100, specifies the test programs. As used herein, the term "computer" is intended to mean a programmable microprocessor, with or without associated peripherals such as a digital mass storage device, keyboard and display, or equivalent interfaces. The important aspect of the computer 118 as used in the preferred embodiment of the present invention, is that a time-dependent fluid pressure, and a time-dependent electrical signal, are independently specified and output from the unit 100 as a result of test programs that are stored in, and executed by, the digital processing means associated with the unit.

In the preferred embodiment, the invention is implemented according to the following sequence. A portable base unit 100 and associated digital processor 118 are positioned in the vicinity of a valve 12 to be tested. Actuator 20a, for operating the valve, can be energized in the most straightforward manner by connecting pneumatic line 112 from port 110 directly to the actuator 20, typically through a T fitting in line 26a. The positioner 24a is then overridden or otherwise deactivated by any of a variety of available techniques such as shutting off air and electrical sources 28a,30a, or sending an appropriate signal along line 32a from the controller 34. In this mode of operation, the actuator 20a is energized solely and directly by the pressure in line 112, which has a time-dependence specified independently of the controller 34, by the test program stored or otherwise defined by the unit 100.

A significant advantage of energizing the actuator 20a via the test program and line 112, is that a time-dependent energizing that would not ordinarily be useful for flow control purposes, but which would be revealing of information useful for diagnostic purposes, can be achieved with the present invention, without modification of the normal control algorithm in controller 34. Moreover, with the computer-implemented embodiment, the operator can select either a known, stored program for execution of the pressure control on line 112, or the operator can modify (and reproduce) the pressure amplitude, or time dependency during the course of performing a sequence of valve energizing cycles. The information flow along line 119 can flow between a base unit and distinct computer 118 as shown in FIG. 1, or the flow can be entirely within the base unit if the computer is incorporated therein.

In the preferred embodiment, the unit 100 is used in conjunction with a direct measurement of the actuator pressure P1 at 122, and the direct measurement of stem movement as manifested by a sensor voltage E1 at 120. Preferably, the base unit 100 includes a measurement input section 124 having a plurality of pressure input ports such as 126,128. Line 122 is directly attached to actuator 20a, and directly connected to measurement port 126. Pressure transducers internal to the base unit 100 convert pressure variations into measured values which are recorded, preferably on magnetic memory or the like associated with computer 118.

Base unit 100 also preferably includes an electrical measurement input section 130 including a plurality of electrical input ports 132, for receiving electrical signals of interest to the diagnostic analysis. One such signal is E1, the voltage output from an LVDT or other intrusive or not intrusive sensor that is responsive to the movement or thrust of stem 22a or similar member in the thrust transmission between the actuator 20a and the valve member in body 16a. It should be appreciated that other pressure and/or electrical signals indicative of valve operation or condition, such as the pressure in positioner air supply line 28a, represented at P2, can be input to the base unit at, for example, port 128.

The base unit 100 has been described above, in terms of its unique capability to override the controller 34 so as to energize the valve 12 according to a desired or known time dependency. The unit output can be pneumatic when it is desired that the positioner be bypassed, or electrical when it is desired that the operation of the positioner be included within the diagnosis.

Figure 2:
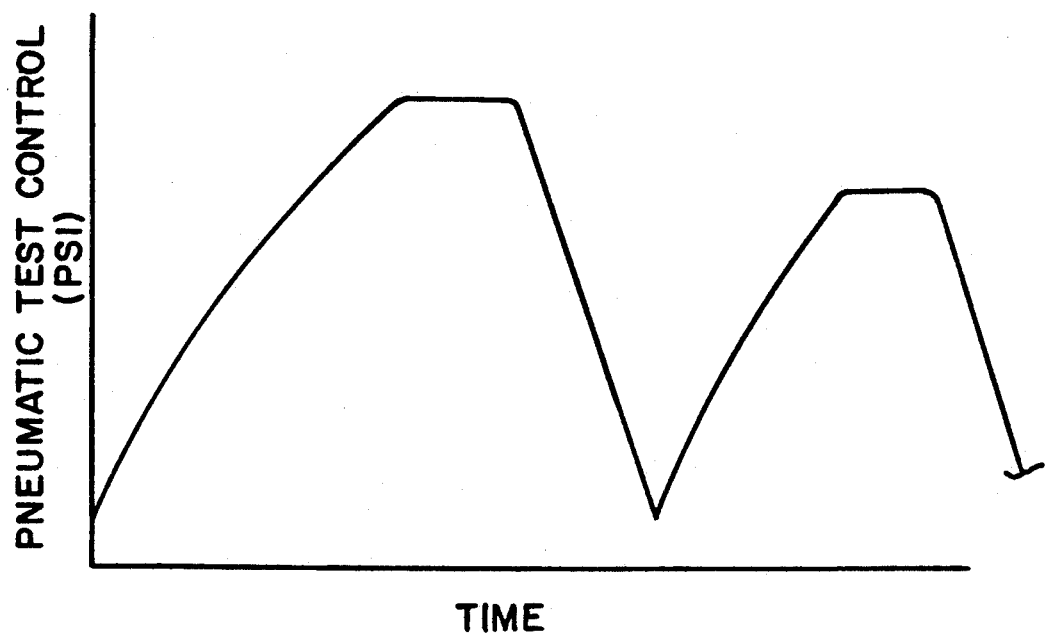
FIG. 2 is a graphic representation of a pneumatic test control signal delivered from the test unit to the valve actuator.

FIG. 2 is a graphic representation of one possible time dependence of the pneumatic test control pressure relationship delivered to actuator 20a via lines 112 and 26a, as a function of time. The resulting stem displacement as manifested by voltage E1, can be recorded in the base unit and the relationship between stem displacement and pneumatic pressure in the actuator as a function of time can be analyzed from the recorded data. The base unit itself not only specifies the time-dependent pressure relationship at port 110, but preferably includes an associated transducer which monitors the pressure at the port.

Figure 3:
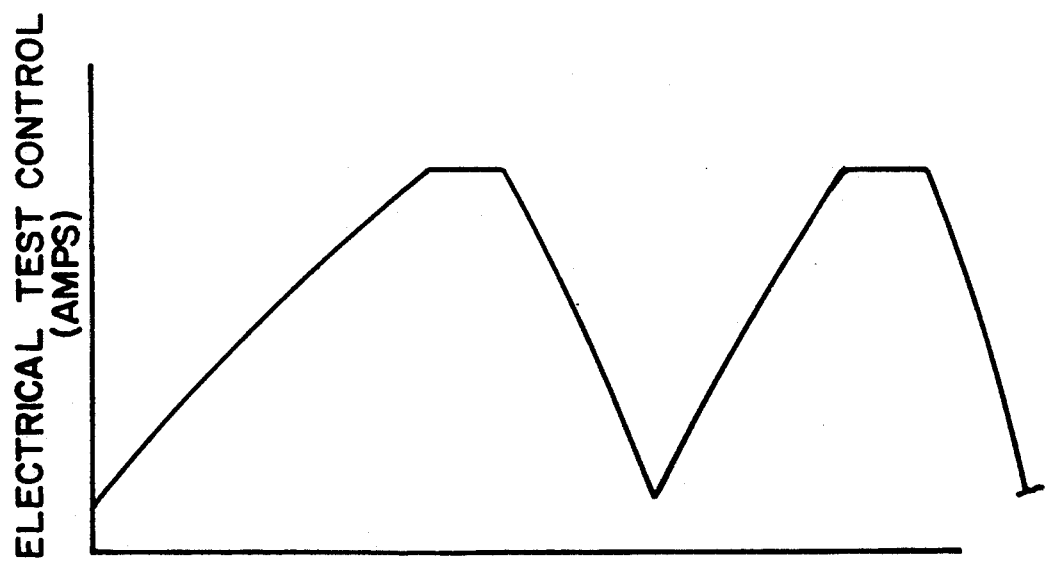
FIG. 3 is a graphic representation of an electrical test control signal delivered from the test unit to the valve positioner.

FIG. 3 is a graphic representation of the electric control signal delivered on line 116 to positioner 24a. This emulates the electrical control signal that would be output from controller 34 to positioner 24a, to achieve the actuating pressure pattern shown in FIG. 2. In this instance, a pressure sensor at 122 would be required to measure the actuator pressure resulting from the control signal 116. If the measured pressure at P1 is different from the pattern shown in FIG. 2, this can be an indication of a problem with the positioner 24a or its associated air or electrical supplies 28a,30a.

Another possible test is to deliver an electrical control signal on line 116, that is identical to a signal that should be generated by the controller 34 for a known valve action. The resulting actuator pressure and/or stem displacement P1,E1 at valve 12, are compared. Differences in valve performance could indicate a problem with the controller internal logic or the like.

As shown in FIG. 1, the base unit 100 is preferably used in conjunction with an auxiliary unit 200, whereby a variety of additional measurement data can be acquired for a single valve 12, or a plurality of valves 12,14. Moreover, the auxiliary unit 200 can be used with a base unit that, unlike the unit 100 described above, does not have the program controlled outputs from ports 110,114.

With reference now to a general auxiliary unit 200, there are shown a plurality of electrical inputs E2-E5. Signal E2 is delivered to the auxiliary unit as a measurement of the electrical control signal from controller 34 as delivered along line 32a to positioner 24a. The controller 34 would normally be remote from valve 12, and therefore a direct electrical line from the controller to the base unit 100, which is at valve 12, would not be convenient. The auxiliary unit 200 can be near controller 34, remote from both the base unit 100 and the valve 12 to be tested, thereby affording the flexibility to receive a voltage signal E2 in the auxiliary unit and to amplify or otherwise condition the signal E2 for delivery from an electrical output port 206, as electrical signal E6 to section 130 of the base unit. Signal E4 on line 32b can also be handled in this fashion for auxiliary unit output E8.

Similarly, auxiliary unit 200 can be located in the vicinity of valve 14, to receive the electrical signal E3 from the stem displacement sensor, into a port 202 for delivery through port 206 and line E7 to base unit section 130.

In another variation, the current supplied by a source of electrical power, for example at line 30b, may be readily sensed, but the input at a port 132 of the base unit may be adapted to receive a voltage rather than a current signal. The auxiliary unit 200 can in this instance receive a current signal E5 through an input port 202, and deliver a voltage signal through an output port E9.

The auxiliary unit 200 also has a plurality of pressure input ports 204 which receive varying fluid pressures through lines P3, P4, P5 and P6, each of which is converted by a transducer into a commensurate electrical output signal E10, E11, E12 and E13, for delivery to section 130 of base unit 100. Although the base unit 100 may have pressure input ports 126,128 in section 124 for connection to a nearby valve such as 12, the receipt of direct pressure variations from a more remote valve such as 14, would degrade the measurement. Accordingly, with the auxiliary unit 200 situated near the other valve 14, pressure measurements such as P3 from actuator 20b can be delivered to the auxiliary unit 200 and converted to an electrical signal for delivery over a longer distance without degradation, to the base unit 100.

It should be appreciated that the auxiliary unit 200 can have any desired number of electrical and pneumatic input ports 202 and 204, and a corresponding number of electrical output ports 206. As an example, twelve ports 206, and a corresponding number of electrical input ports 132 on base unit 100, has been found desirable.

What is claimed is:

1. In a system for acquiring data from a valve in a process plant flow line, wherein said valve has a flow bore, means for sealing the flow bore against flow, stem means connected to the means for sealing, a fluid driven actuator for selectively moving the stem means between open and closed positions whereby the means for sealing opens and closes the flow bore respectively, a valve positioner responsive to a process control signal, for fluidly energizing the actuator commensurately with the process control signal, a valve process controller remote from the valve, for generating the process control signal, and a portable data acquisition unit connected to the valve for sensing valve operating parameters, wherein the acquisition unit comprises first fluid pressure means connected to the valve between the positioner and the actuator for energizing the actuator according to a first time dependent test program independently of the process controller, and second means connectable to the valve for delivering a test control signal to said positioner according to a second time dependent test program independently of the process controller and of said first means.

2. The system of claim 1, including digital processing means coupled to the unit, for storing and executing said first and second test programs.

3. The system of claim 1, wherein the first means includes a test fluid flow line for delivering actuating fluid from the unit to the actuator, and a fluid source flow line for supplying actuating fluid from a source of fluid to the unit.

4. The system of claim 1, including third means, coupled between the valve and the unit, for measuring at the valve and recording at the unit, the movement of the stem in response to the energizing of the actuator by one of said programs.

5. The system of claim 1, wherein the valve is a pneumatically operated valve and the first means includes a test pressurization line temporarily attached to the actuator, for supplying pneumatic pressure to the actuator.

6. The system of claim 1, wherein the valve is an hydraulically operated valve and the first means includes a test pressurization line temporarily attached to the actuator, for supplying hydraulic pressure to the actuator.

7. The system of claim 1, wherein the second means includes wire means for delivering an electrical test control signal from the unit to the positioner, and an electric power source connected to the unit.

8. The system of claim 7, wherein said second program specifies a time dependent variation in the electrical test control signal.

9. The system of claim 1 wherein,
the first means includes a test fluid flow line for delivering actuating fluid from the unit to the actuator, and a fluid source flow line for supplying actuating fluid from a source of fluid to the unit,
the second means includes wire means for delivering an electrical test control signal from the unit to the positioner, and an electric power source connected to the unit,
said first program specifies a time dependent fluid pressure delivered by said first means to the actuator, and
said second program specifies a time dependent variation in the electrical test control signal.

10. The system of claim 9, including digital processing means coupled to the unit, for storing and executing said first and second test programs.

11. A method for testing a fluidly actuated valve in a process flow line wherein said valve has a flow bore, means for sealing the flow bore against flow, stem means connected to the means for sealing, a fluidly driven actuator for selectively moving the stem means between open and closed positions whereby the means for sealing opens and closes the flow bore respectively, a valve positioner responsive to a process control signal, for fluidly energizing the actuator in response to the process control signal, and a valve process controller remote from the valve, for generating the process control signal, wherein the method comprises the steps of:
positioning a test unit in the vicinity of the valve, the test unit having means defining a time-dependent valve test control program;
connecting a fluid pressure line from the test unit to the valve, between the positioner and the actuator;
overriding the positioner by controlling the operation of the valve by varying the fluid pressure supplied to the actuator through said pressure line in accordance with said time-dependent valve test control program; and
measuring at least one operating characteristic of the valve during said operation in accordance with the test control program.

12. A method for testing a valve in a process plant flow line, wherein said valve has a flow bore, means for sealing the flow bore against flow, stem means connected to the means for sealing, a fluidly driven actuator for selectively moving the stem means between open and closed positions whereby the means for sealing opens and closes the flow bore respectively, a valve positioner responsive to a process control signal, for fluidly energizing the actuator in response to the process control signal, and a valve process controller remote from the valve, for generating the process control signal, wherein the method comprises the steps of:
positioning a test unit in the vicinity of the valve, the test unit having first fluid pressure means for directly energizing the valve actuator according to a first time dependent test program independently of the positioner, and second means for delivering a test control signal to said positioner according to a second time dependent test program independently of the process controller;

connecting said first means to the valve actuator;

selecting said first program;

overriding the valve positioner with said selected program, whereby the actuator is energized according to the first of said time dependencies;

connecting the second means to the positioner;

selecting and energizing the valve according to said second program; and measuring the fluid pressure in the actuator resulting from the valve actuation according to the second program.

13. The method of claim 12, including the step of measuring movement of the stem resulting from the valve actuation according to the selected program.

14. The method of claim 13, wherein the step of measuring the stem movement includes mounting a sensor at the valve, delivering a sensor output signal to the unit, and recording the measurement in the unit.

15. A method for testing a fluidly actuated valve in a process plant flow line, wherein said valve has a flow bore, means for sealing the flow bore against flow, stem means connected to the means for sealing, a fluidly driven actuator for selectively moving the stem means between open and closed positions whereby the means for sealing opens and closes the flow bore, respectively, means for generating an electrical process control signal, and positioner means responsive to the process control signal, for fluidly energizing the actuator, wherein the method comprises the steps of positioning a test unit in the vicinity of the valve;

connecting a test fluid pressure line from the test unit to the valve, between the positioner and the actuator;

deactivating the positioner;

providing a variable pressure in the test line sufficient to actuate the valve through said actuator;

during the step of actuating recording the magnitude of the variable pressure supplied to the actuator through said pressure line, and sensing and recording an operating characteristic of the valve other than said variable pressure.

16. The method of claim 15, further including the steps taken independently of said previously recited steps, of connecting an electrical test signal line from the test unit between said controller means and said positioner means;

providing a variable electrical signal on said test line for controlling said positioner;

measuring the actuator pressure resulting from the action of the positioner; and comparing the time dependent actuator pressure resulting from the positioner action from the test control signal, with the time dependent pressure resulting from the control of the actuator through said pressure test line; and from said comparison, diagnosing an operating characteristics of said valve.

* * * * *